Aug. 12, 1924.
D. E. CARMONY
WINDING REEL ATTACHMENT FOR TRACTORS
Filed March 28, 1924
1,504,939
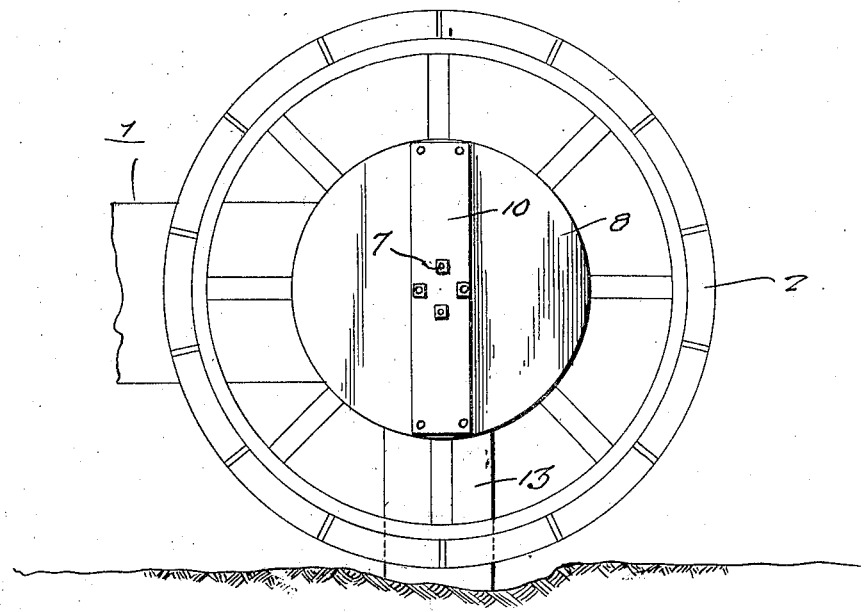
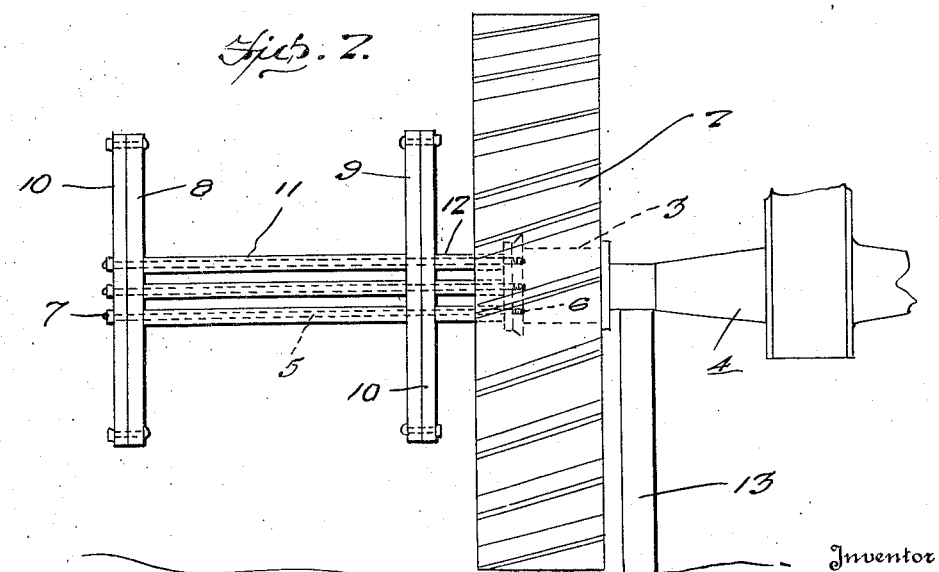

Patented Aug. 12, 1924.

1,504,939

UNITED STATES PATENT OFFICE.

DAVID EZRA CARMONY, OF MANILLA, INDIANA.

WINDING-REEL ATTACHMENT FOR TRACTORS.

Application filed March 28, 1924. Serial No. 702,645.

*To all whom it may concern:*

Be it known that I, DAVID EZRA CARMONY, a citizen of the United States, residing at Manilla, in the county of Rush and State of Indiana, have invented certain new and useful Improvements in Winding-Reel Attachments for Tractors, of which the following is a specification.

This invention relates to new and useful improvements in winding reel attachment for Fordson tractors or the like and has for its principal object to provide simple and efficient means whereby barbed fence wires and the like may be readily wound around the reel thus saving considerable time and labor.

A further object of the invention is to provide a reel attachment principally adapted for use on a Fordson tractor wherein the same is adapted to be driven by one of the traction driving wheels of the tractor so as to facilitate the easy and quick winding of the wire on the reel thereby obviating the necessity of having to employ a number of men in order to wind up or unwind the wire on the reel as the case may be.

A further object of the invention is to provide a winding reel attachment of the above mentioned character, which is simple in construction, inexpensive, strong and durable, and further well adapted for the purposes for which it is designated.

Other objects and advantages of this invention will become apparent during the course of the following description.

In the accompanying drawing forming a part of this specification and in which like numerals designate like parts throughout the same:

Figure 1 is a fragmentary front elevation of my invention showing the same in position on one of the drive wheels of a Fordson tractor.

Figure 2 is a fragmentary end elevation thereof.

Figure 3 is a detail view of one of the rods.

In the drawing wherein for the purpose of illustration is shown the preferred embodiment of my invention, the numeral 1 designates generally a tractor of the well known construction, which is provided with the usual traction driving wheel 2, the latter having its hub portion 3 supported on the axle 4 in the well known manner. In applying my winding wheel attachment to the driving wheel 2 of the tractor, the usual bolts are removed from the end of the hub bushing of the wheel so that the apertures which are formed in the end of the hub or bushing 3 and which normally receive the bolts carried by the base plate will be adapted to receive the inner ends of the supporting bolts hereinafter to be more fully described.

My winding reel attachment comprises a plurality of elongated rods which are provided at their inner ends with the threaded portions 6, the purpose of which is to provide a means for permitting the threaded ends of the bolts to be supported in the threaded apertures provided in the hub 3 of the wheel. The opposite ends of the rods 5 are also threaded and are adapted to receive thereon the nuts 7 in the manner as clearly shown in the drawing. Supported on the elongated rods 5 are the end disks 8 and 9 respectively. It is to be understood that each of these disks are provided with suitable openings in the central portions thereof whereby the same may be supported on the rods. Reinforcing plates 10 are secured to the outer faces of the disks 8 and 9 and also have a series of openings provided in the central portion thereof to register with the openings provided in the disks whereby the same may be supported on the rods 5.

For the purpose of supporting the disks 8 and 9 in spaced relation with respect to each other and in spaced relation to the hub of the traction wheel 2, I provide a series of tubular sleeves 11 which are of such length as to extend between the disks 8 and 9, it being understood that the disk 8 is preferably supported adjacent the outer ends of the rods and the disk 9 is supported at a point adjacent the threaded ends of the rods. For the purpose of holding the disk 9 in spaced relation with respect to the hub 3, I provide the shorter tubular sleeve 12, in the manner as shown in Figure 2 of the drawing.

When it is desired to wind the wire around the reel formed by the end disks and the rods and tubular sleeves 11 extending between the disks, the tractor and the traction wheel 2 are raised up off of the ground and supported in such a manner by any suitable means such as is shown at 13 in the drawing. The usual bolts in the hub bushing are then removed and the threaded ends of the rods are then inserted through the openings in the hub bushing and provided in the wheel arranged as shown in Figure 2. The wire may be wound around the reel by the rotation of the traction wheel in the proper direction. The unwinding of the wire on the reel may also be performed by the reverse rotation of the traction wheel 2. The wire wound around the reel may be removed without detaching the device from the wheel by removing the nuts 7 and the disk 8.

It will thus be seen from the foregoing description, that a winding reel attachment for use in connection with Fordson tractors or the like has been provided which is of such construction as to enable the same to be readily placed in position thereon and when in use will save considerable time and labor in winding the fence wire on the reel, which heretofore has required the employment of several men when winding the fence wire on a reel by hand. Furthermore the simplicity of my device enables the same to be manufactured at a minimum cost and the parts may be readily disassembled and carried in a convenient manner upon the vehicle whereby the same is accessible for use whenever desired.

While I have shown the preferred embodiment of my invention, it is to be understood that various changes in the shape, size and arrangement of parts may be resorted to without departing from the spirit of the invention and the scope of the appended claim.

Having thus described my invention, what I claim is:—

A winding reel attachment for traction wheels of a motor vehicle comprising a plurality of elongated rods threaded at their inner ends for engagement with the threaded openings provided in the hubs of said traction wheel, a pair of disks supported on said rods, spacing sleeves mounted on said rods and between said disks, additional spacing sleeves mounted on said rods between the hubs and the inner disks whereby said disks are supported in spaced relation with respect to each other and with respect to the hub of the traction wheel.

In testimony whereof I affix my signature.

DAVID EZRA CARMONY.